United States Patent Office 3,846,291
Patented Nov. 5, 1974

3,846,291
PROCESS OF AND INSTALLATION FOR
PURIFYING SEWAGE
Christian Brucker, Vico, Yvelines, France
Filed Aug. 7, 1972, Ser. No. 278,228
Claims priority, application France, Aug. 9, 1971,
7129033
Int. Cl. C02c 1/08
U.S. Cl. 210—14
19 Claims

ABSTRACT OF THE DISCLOSURE

A sewage purification process including aeration of sludge employing biological evolution of micro-organisms, the sewage entering an oxidation basin on the upstream side and the treated water being removed on the downstream side, and distributing along the path of liquid flow in the basin the process phases of latency acceleration, multiplication, slowing down, stationary state and decline of the micro-organisms, using a travelling support on the basin and supporting a device for scraping the basin bottom in conjunction with a pumping and dispersed device.

BACKGROUND OF THE INVENTION

1. Field of the invention

This invention relates to the purification of municipal and industrial sewage by the biological degradation method utilising activated sludge.

2. Description of the Prior Art

As is known, after a series of preliminary operations such as screening, raising, separation of oil and separation of grit, this technique comprises treatment of the residual waters in two stages namely oxidation and decantation.

In the oxidation stage the organic impurities contained in the water to be treated are biologically degraded by the micro-organisms of the activated sludge. The activated sludge is separated from the purified water in the decantation stage and recylcled at a variable rate.

For the oxidation a large variety of means are employed at the present time, such as horizontal brushes which beat the surface of the water, compressors which force air into perforated pipes immersed in an oxidation basin, turbines introducing air into the water or dispersing air in the water or dispersing drops of water in air.

It should be noted that in these installations the operations of oxygenation, mixing, and movement of the medium are effected with the aid of one and the same device.

The water to be treated, oxygen, and micro-organisms are usually mixed in the basin generally with vigorous agitation. It is this mixture which passes into the decanter, which therefore contains, among other matter, a more or less considerable residual poluting charge depending on the preferential currents.

If the biochemical reactions during which the reduction of organic material takes place are studied, the following periods will be observed namely seeding of the micro-organisms, coagulation, flocculation and precipitation; it is therefore necessary to decant and separate the aforesaid sludges which fall through gravity and which constitute a medium having a considerably higher content of micro-organisms than the decanted water.

The main object of the present invention is to provide a process and apparatus for purifying sewage in which, taking into account the different stages of the biochemical process, provides an ordering of the movement which forces the water to pass progressively through these different stages.

A further object of the invention is to obtain improved efficiency of the biochemical purification process in comparison with known processes, employing a process which is simple to carry out and an installation which is economical to construct and can easily be adapted to the most diverse requirements.

SUMMARY

According to the invention a process of purifying sewage comprises establishing a distribution, in the direction from upstream to downstream, of the different phases of latency, acceleration, multiplication, slowing down, stationary state, and decline of the micro-organisms.

This process entails the utilisation of aeration and agitation means, and this means may be displaced from upstream to downstream and vice vera, and is so designed as to be able to put into operation at will and for variable periods of time at various points on its path, and to have a limited action along this path.

In the process, the aeration and agitation operation is carried out by taking up by pumping the sludge decanted in an oxidation basis and its return to said basin after dispersal in the air.

Thus, as the result of being thrown into the air in this way, the sludge is very effectively oxygenated.

Preferably the bottom of the basin is subjected to cyclic scraping with a view to pumping.

Scraping in this way enbales the said sludge to be collected by gravity and the scraping may be directed either from downstream to upstream or alternatively towards downstream and towards upstream, the return preferably being in the upstream direction.

The sludge is thus subjected at will to periods of collection, agitation-oxidation, and recycling, while the recycling may be effected independently of the actual agitation-oxidation, through simple scraping in the upstream direction.

The water flows slowly in substantially parallel streams in the downstream direction. Its polluting charge (and therefore the oxygen which it requires) decreases progressively through successive biological reactions and through decantation until it tends to disappear. In the same period of time the micro-organisms are arranged in accordance with the different phases or periods of their existence namely latency, aceleration, multiplication, slowing down, stationary state, decline. An advantage of the process is that it makes this arrangement possible in accordance with an order relative to the vitality of the micro-organisms from upstream to downstream; another advantage consists of the fact that it is at the same time possible to effect judicious distribution of the amount of oxygen supplied, in such a manner as to adapt oxygenation to the ecology of the medium; in all stages of evolution the rate and the duration of the agitation-oxidation effected by pumping are controlled.

Since the agitation-oxidation entails the return of the sludge preferably in the upstream direction, as has been seen, a zone of the basin corresponding to a given phase of the biological evolution of the micro-organisms can be reseeded by micro-organisms taken out downstream and therefore in a more advanced phase of evolution; this arrangement permits a substantial improvement of the overall efficiency of the purification, particularly because of the accustoming acquired by the micro-organisms thus taken out. The invention thus makes it possible for any zone in the basin to have the benefit of conditions of improved biological efficiency which may prevail in a zone generally situated further downstream; such improved efficiency may result either from the more advanced age of the micro-organism taken out or from the accustoming progressively acquired by the micro-organism in respect of certain adverse elements contained in the sewage.

In other words, the evolution of a micro-organism from upstream to downstream in the system may entail a process which can be described as being of the pilgrim step type, in the sense that it will comprise a series of forward steps alternating with returns in the rearward direction; micro-organisms in the phase of decline will thus be able to reseed a zone normally stocked by micro-organisms in the phase of latency or acceleration.

Starting from the downstream end of the oxidation basin the water may be directed towards a decanter. For the purposes of this transfer the water in the oxidation basin may be taken up from a depth which is adjustable and transferred to the surface with a cascade fall towards the decanter.

For carrying out the process of the invention a sewage purification installation is provided of the type comprising an oxidation basin and a decanter, the basin being confined between two lateral banks on which running tracks are provided which permit the movement of a travelling bridge carrying a device for scraping the bottom of the basin.

The travelling bridge also carries a pumping and dispersal device with at least one suction means and at least one delivery nozzle disposed above the surface of the water of said basin.

In a first embodiment the scraping device comprises a sludge trap formed of at least one dihedron of vertical plates and one horizontal plate forming a cover, this trap being surmounted by a system of agitation deflectors composed of a series of crossing sections between two pairs of vertical uprights.

Alternatively the scraping device may comprise deflector blades adapted to bring the sludge towards the suction means.

In all cases, the delivery nozzles are advantageously directed upstream.

An installation of this kind provides in particular the advantage that it can be adapted with extremely great flexibility to the variable requirements of the most diverse installations.

BRIEF DESCRIPTION OF THE DRAWINGS

The invention will now be further described by way of example and with reference to the accompanying drawings in which.

DESCRIPTION OF THE PREFERRED EMBODIMENTS

Figure 1:
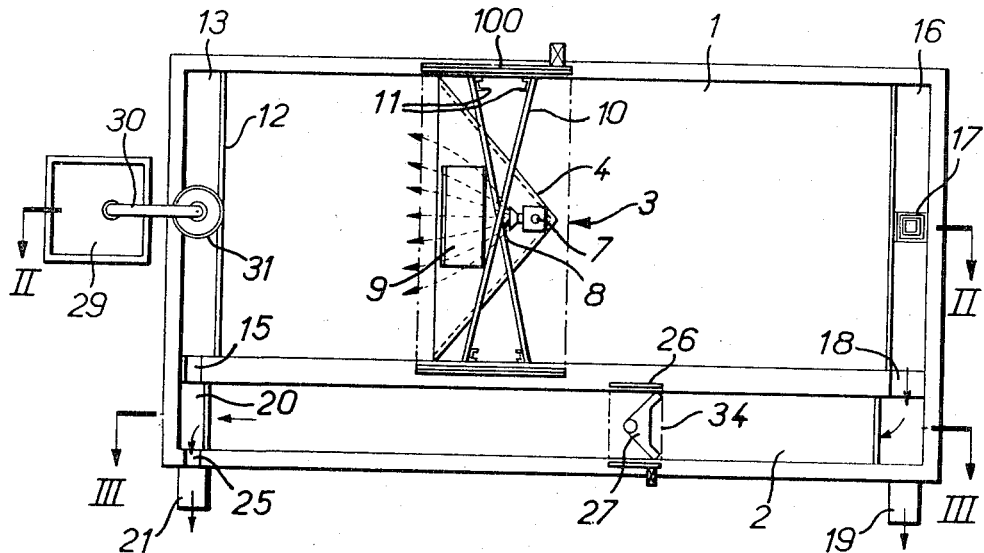
FIG. 1 shows in plan a purification installation according to the invention in a first embodiment.

Referring to the accompanying drawings, and more particularly to FIG. 1 the parellelepipedic basin 1 is the oxidation basin and the basin 2 the decanter. A travelling transverse bridge 3 is reciprocable in the longitudinal direction on running tracks on the longitudinal side walls of the basin 1. At the bottom the travelling bridge 3 is provided with a scraper 4 composed of two blades in a V-shaped arrangement, the opening of the V being such that when the bridge 3 moves they sweep substantially over the entire width of the bottom of the basin 1. Above the scraper 4 a horizontal plate 5 (FIG. 2) is disposed forming a cover and thus constituting a sludge trap 6. In the sludge trap 6 there is a suction pipe 7 provided with a delivery pump (not detailed). The top outlet of this pipe 7 ends in an atomiser or diffuser device 8 in the form of a jet, nozzle, or the like, which is intended to disperse the sludge delivered to form fine droplets. Facing the diffuser 8 a plate 9 is disposed for spreading out by reflection the jet coming from the diffuser 8. The bridge also carries a system of agitation deflectors 10 disposed at a height between the plate 5 and the diffuser 8 and composed of a series of crossing sections between two pairs of vertical uprights 11, for example in the form of angle sections, disposed along the side walls of the basin 1.

Lateral wind breaker screens 100 are provided at the top of the travelling bridge 3, to prevent the horizontal component of the wind from diverting the trajectories of the droplets of sludges dispersed at 8 and reflected at 9.

Figure 2:
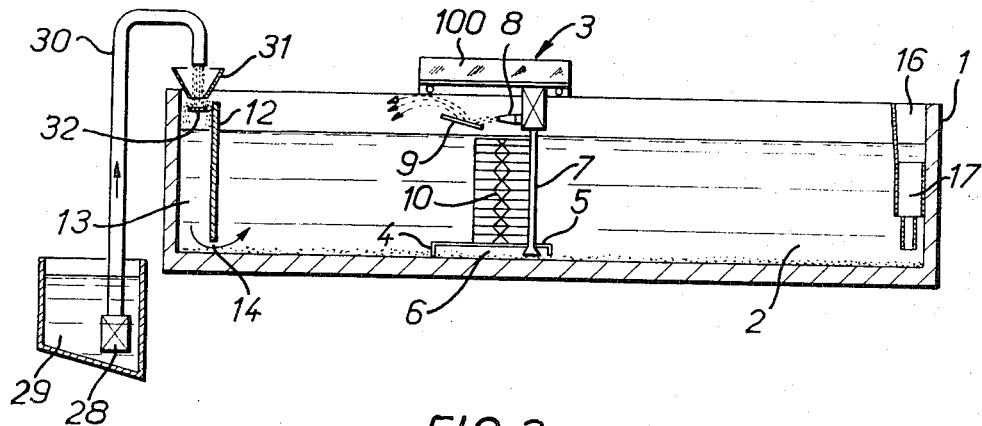
FIG. 2 is a section along the line II—II in FIG. 1.

At the head of the basin 1 (on the left in FIGS. 1 and 2) a transverse siphonal partition 12 bounds a sewage admission compartment 13 which is open transversely at the bottom to form a passage 14 giving access to the actual basin 1 (FIG. 2). A transverse passage 15 is provided in the side wall adjacent to the decanter 2 to establish if required direct communication between the admission compartment 13 and the decantation basin 2 bypassing the oxidation basin 1.

The opposite end of the oxidation basin (on the right in FIGS. 1 and 2) corresponding to its outlet at the top is a transverse spout 16 connected at the bottom to a pipe 17 composed of at least two telescopic sleeves. The spout 16 opens into the decanter 2 by way of a staircase overflow 18.

Figure 3:
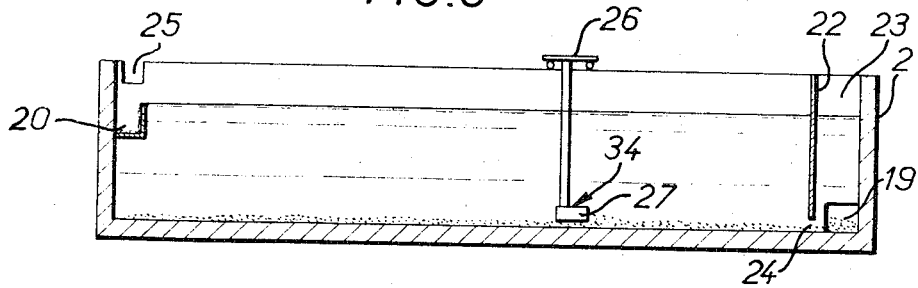
FIG. 3 is a section along the line III—III in FIG. 1.

In FIG. 3 the decanter 2 is shown with a horizontal parallelepipedic shape; its structure is similar to the oxidation basin 1: at the end corresponding to the inlet of the decanter a siphonal partition 22 bounds a compartment 23 and a bottom passage 24 in the decanter. In addition, a sludge discharge pipe 19 has its mouth above the bottom of the compartment 23.

At the top of the other end of the decanter 2 (on the left in FIG. 3) is a water take-up spout 20 supplying an outer outlet pipe 21 for treated water. In addition, a safety bypass pipe 25 is provided.

A travelling bridge 26 carrying a scraper 27 similar to the scraper 4 of the oxidation basin is disposed on running tracks provided on the longitudinal side walls of the decanter 2.

The residual water is admitted at the inlet of the installation into a pit 29, from which it is pumped by a pump 28 through a bent pipe 30 discharging above a funnel 31 disposed vertically in line with a deflector 32 above the water level of the admission compartment 13.

The operation of the installation thus constituted is as follows:

The residual water, optionally after undergoing the usual preliminary treatments, such as removal of grit and/or oil, is delivered by the pump 28 and the associated pipe 30 from the pit 29 so as to undergo a first oxygenation by aeration by being poured in the open air into the funnel 31, then falling as a cascade into the admission compartment 13 of the basin 1 and rebounding from the dispersal plate 32 (FIG. 2). The water passes into the basin 1 under the siphonal partition 12 which traps oil, grease, and other residual floating material. The travelling bridge 3 reciprocating over the major part of the length of the basin 1 stirs up the circulating water by the crossed agitation deflectors 10. At the same time, the scrapers 4 of the bridge 3 collect in the sludge trap 6 at the bottom of the travelling bridge 3 the sludge which has settled at the bottom of the basin 1, the plate 5 preventing the sludge from rising again. The scrapers 4 form a dihedron which is open towards the upstream side and perform a reciprocating movement, so that scraping is directed from downstream to upstream.

It should be noted that alternate scraping in the downstream direction and in the upstream direction could easily be employed by providing suitably shaped scrapers 4; for this purpose it would for example be possible to provide a scraper having the shape of dihedra which have their apices opposite or alternating and which are open towards the upstream and downstream sides respectively, particularly in X or W form.

Although FIGS. 1 to 3 show a scraper 4 in the shape of a single dihedron for scraping from downstream to upstream, it will be understood that scrapers of different shapes, forming for example a series of juxtaposed dihedra, could serve the same purpose.

The sludge collected in the sludge trap 6 is taken up by pumping and passes through the pipe 7 to the top outlet, from which it is thrown into the air by the diffuser 8, which is adapted to provide diffusion in droplets with an elongated trajectory in the air, thus promoting the oxygenation of the decanted sludge. The diffused jets of sludge are advantageously thrown back by the plate 9 forming a deflector, so that the action of oxidising the sludge in the air is further improved.

The sludge thus oxidised falls back into the basin 1, in which the action applied by the deflectors 10 provides on the one hand a certain surface aeration and on the other hand periodic stirring of the entire liquid mass, thus promoting the formation and maintenance of particularly effective flocculation.

It should be observed that the scraper bridge and the associated pump work entirely independently, so that any timing is permissible, irrespective of for example the periods, the rate of admission of the influent, its charge or the metabolism of the micro-organisms. For example, if the metabolism of the micro-organisms necessitates a greater amount of oxygen at the upstream side of the basin, the autonomous pump which serves the purpose of agitating and oxidising the sludge will operate more frequently in this part of the basin, independently of the rate adopted for the function of recycling or taking-up of sludge which may affect all or part of the basin; thus complete flexibility will be achieved, as is desirable in order to obtain optimum value of the mass charge (DBO/dry matter) in each zone of the basin. In addition, the path of the movement of the bridge may be varied to concentrate its activity in the areas of the basin requiring the most treatment.

The water is taken out at the other end of the basin 1 through the pipe 17, the height of which is telescopically adjustable, thus making it possible to select proportions of the mixture of water and sludge which will be most favourabe to the ecology of the medium. The mixture of water and sludge then enters the spout 16 and overflows as a cascade into the decanter 2, passing over the threshold 18. The threshold 18 thus controls the level of water in the oxidation basin 1. A cascade fall offers the advantage of further oxygenation of the mixture of sludge, flakes, and water before it reaches the decanter 2. The oxygen rate at this stage is generally about 1 g./m.$^3$.

The siphonic partition 22 of the decantation basin 2 causes the water to pass through at the bottom, and therefore to deposit through the matter aready settled. The settled sludge on the bottom of the basin 2 is driven in countercurrent by the travelling scraper bridge 26 towards the discharge pipe 19 disposed at the upstream end, where it is discharged towards the drying beds, for example by hydrostatic pressure or a pump if the drying beds are situated at a higher level. At the other end, downstream of the basin 2, the treated water is taken up through the spout 20 which controls the water level.

Finally, the purified water is passed to a utilisation or further treatment station or to a river or flowing stream through the downstream discharge pipe 21.

The working conditions of the decanter 2 vary in accordance with the size of the purification station. Scraping may be effected in the direction of flow or in countercurrent, and the scraper 7 will be given a suitable shape with a horizontal deflector plate 34 preventing the sludge from rising. The pump delivering sludge to the drying beds may be autonomous or coupled to the pump of the scraper bridge 3 of the oxidation basin 1.

Figure 4:
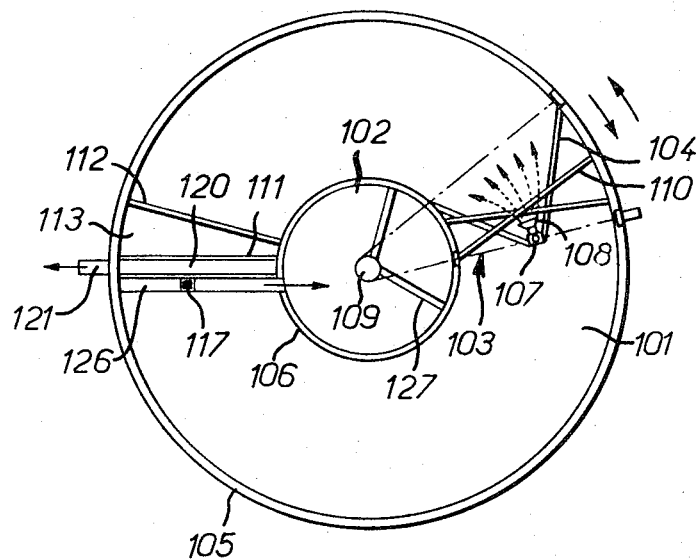
FIG. 4 shows in plan a purification installation according to a second embodiment.
Figure 5:
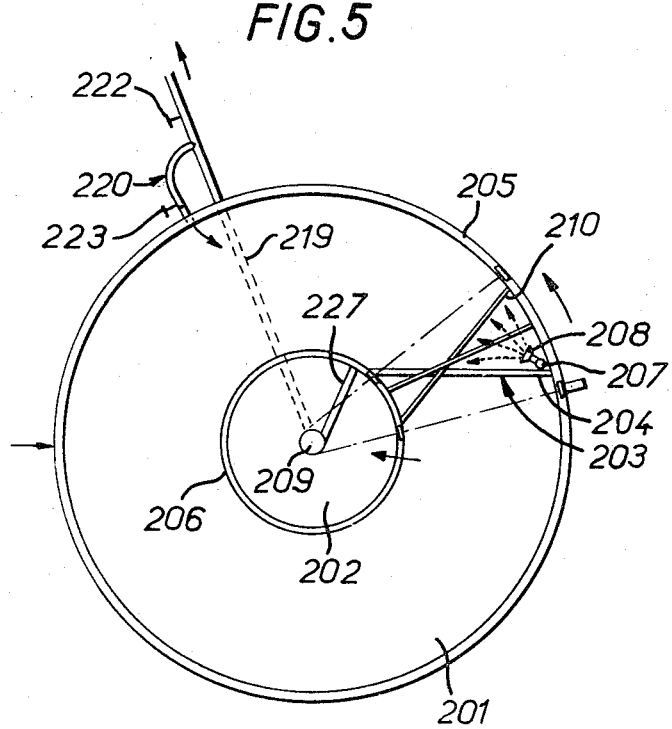
FIG. 5 shows in plan a purification installation according to a third embodiment.

Other basin structures may also be used for carrying out the process of the invention, for example concentric circular basins, as illustrated in FIGS. 4 and 5.

In the construction of FIG. 4, the purification installation comprises an annular oxidation basin 101 and a concentric circular decantation basin 102. A radially disposed scraper bridge 103 is movable about a central pivot 109 on running tracks provided for the purpose on the outer cylindrical side wall 105 and inner cylindrical side wall 106 of the basin 101.

As in the previous embodiment, the travelling bridge 103 is provided at the bottom with a dihedral scraper 104 sweeping substantially the entire width of the bottom of the basin 101 in the course of the rotation of the travelling bridge 103. Nevertheless, in this particular embodiment these plates do not form a closed angle, so that they leave a sludge channel at the bottom of the basin during their circular reciprocating movement about 109. The other elements of the travelling bridge 103, that is to say the mud trap, suction pipe 107, diffuser 108, and a system of agitation deflectors 110, are substantially similar to the corresponding elements, of the bridge 3 which were described with reference to FIGS. 1 to 3.

In the basin 101 a radial siphonic partition 112 and another radial partition 111 bound a compartment 113 for the admission of sewage, this compartment being open at the bottom of the partition 112, like the compartment 13 in FIGS. 1 and 2.

The oxidation basin 101 is in communication with the decanter 102 through a top radial spout 126 and a telescopic pipe 117 similar to the pipe 17 in FIGS. 1 and 2.

The decanter 102 has a scraper 127 in the form of a dihedron and is mounted for rotation about the central pivot 109 and driven together with the bridge 103. A radial spout 120 and an outer pipe 121 discharge the treated water from the decanter 102.

The mode of operation of an installation of this kind is as follows. The residual water which has undergone preliminary treatment is delivered by a pump to the compartment 113 of the oxidation basin 101. It is then passed through the bottom, passing under the siphonic partition 112 which retains oils, grease, and floating matter. The circulating water is stirred by the crossed deflectors 110 of the travelling bridge 103 which, taking into account the presence of the partitions 111 and 112, are moved alternately in the direction of the current, that is to say in the clockwise direction, from the siphonic partition 112 towards the spout 126, and in countercurrent from the spout 126 to partion 112. In the course of this reciprocating movement the sludge settled at the bottom of the basin 101 is collected by the scraper 104 and taken up by pumping into the pipe 107 and then diffused in the air by the diffuser 108. The water is taken up by the set of telescopic sleeves 117, passes into the spout 126, and overflows as a cascade into the decanter 102 in the direction indicated by the arrow at the end of the spout 126 (see FIG. 4). The treated water then leaves the decanter 102 through the radial spout 120 and the pipe 121, and is then passed to a utilisation or further treatment station, while the sludge collected by the scraper 127 is discharged or recycled by means not further described.

In the third embodiment illustrated in FIG. 5, a substantially similar circular structure and arrangement have been provided for the oxidation basin 201 and decantation basin 202. The sludge collector scrapers 204 and 227 of the basins 201 and 202 are straight blades which are inclined in relation to a radial direction. The scraper 227 of the basin 202 is mounted for rotation on the central pivot 209.

A scraper bridge 203 provided with a scraper 204 and elements 207, 208, 210 respectively constituted by a sludge raising pipe, a diffuser, and a system of agitation reflectors, all of which are substantially similar to those described in the previous embodiments, performs a unidirectional circular movement about the central pivot 209. The diffuser 208 as well as the vertical pipe 207 and the sludge suction pump are disposed on the periphery of the oxidation basin 201 against the wall 205. The diffuser 208 is directed substantially along the bisector of the angle formed by the plane of the scraper 204 and the plane tangent to the wall 205. A pipe 219 for discharge of the sludge collected by the scraper 227 extends radially from the central zone of the bottom of the decanter 202 to a point outside the installation, where it is connected to a sludge recycling pipe 220 and control valves 222 and 223.

In this particular embodiment the complete circular movements of the travelling bridge 203 of the basin 201 and of the scraper 207 of the basin 202 are made possible because the basins contain no radial partition to form an obstacle. The water to be treated is poured into the oxidation basin 201, in which it is stirred and ventilated by the travelling bridge 203, which is driven in a rotational movement around the central pivot 209.

It should be observed that through the special arrangement of the diffuser 208 the oxidation of the sludge is localised mainly in the peripheral zone of the basin 201.

The mixture of sludge, flakes, and water then passes into the decanter 102 at the point 202 of the wall 206. After decantation the scraper 227 collects the sludge, which is passed into the pipes 219, 220, the control valves 222 and 223 making it possible to obtain partial or complete recycling, while the treated water is discharged, as in the other embodiments, to a utilisation or further treatment station.

Figure 6:
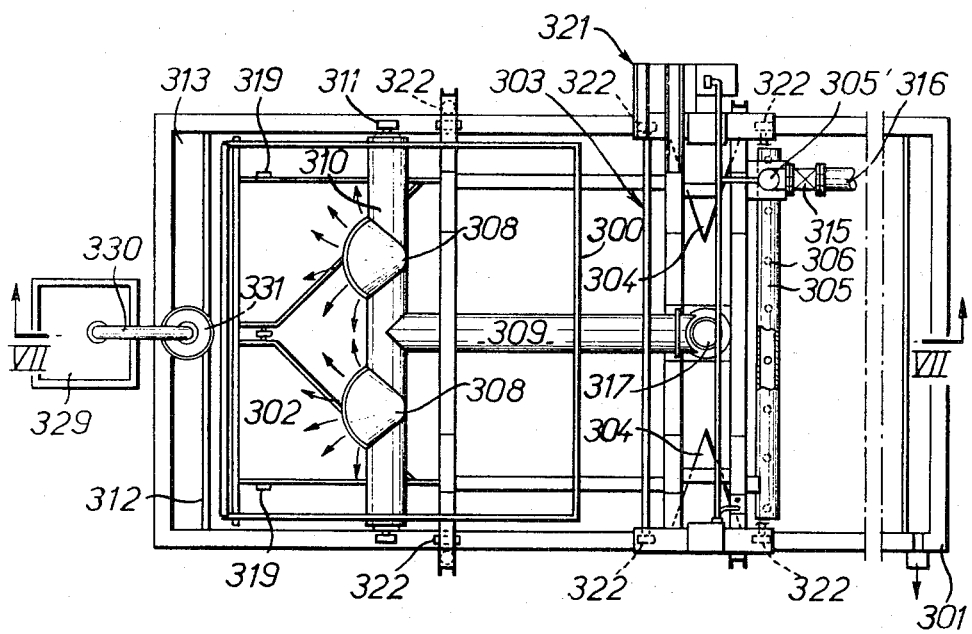
FIG. 6 shows in plan a purification installation according to a fourth embodiment.
Figure 7:
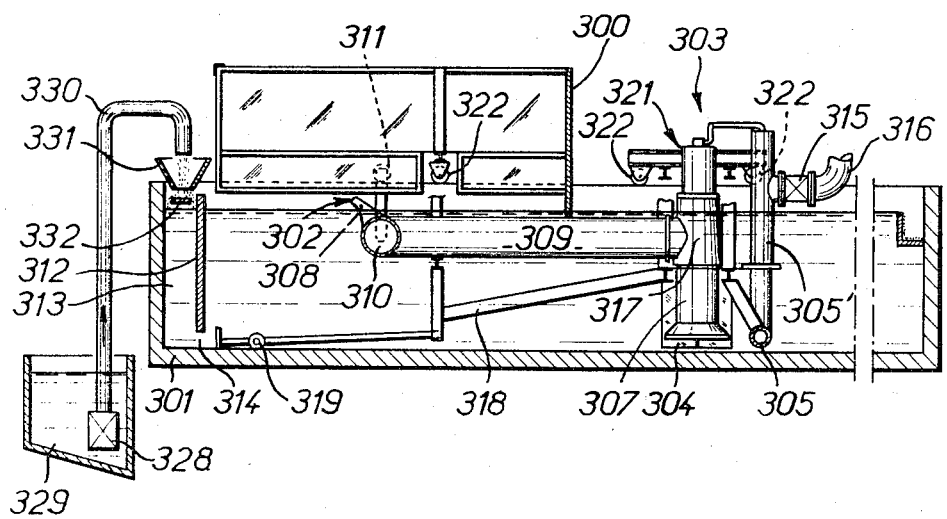
FIG. 7 is a view in section along the line VII—VII in FIG. 6.

In the fourth embodiment illustrated in FIGS. 6 and 7, the installation of simplified type comprises essentially an oxidation and decantation basin 301 of parallelepipedic shape similar to that of the basin 1 of FIGS. 1 and 2.

A transverse travelling bridge 303 is adapted to move in a reciprocating movement in the longitudinal direction, entirely like the similar bridge in FIGS. 1 and 2. This travelling bridge 303 is provided at its bottom part with deflector blades 304, a suction pipe 307 associated with a delivery pump 317, and a sludge withdrawal tube 305 pierced by suction apertures 306. The pipe 307 is in communication with a longitudinal pipe 309, the latter leading into a transverse tube 310 suspended by rollers 311 on the side walls of the basin 301. The tube 310 is provided with atomisation nozzles 308, which are advantageously inclined about 60° above the level of the water, discharging through atomisation slots 302 near the water level.

In the proximity of one of its ends the sludge take-up tube 328 is in communication with a vertical pipe 305' leading to a sludge pump 328 to which there may be connected to flexible pipe 316 leading to drying beds (not shown). At the top of the travelling bridge 303 a windbreaker box 300 covers the atomiser assembly 308, 309, 310 and is adapted to serve the same purpose as the screens 100 in FIGS. 1 and 2.

The bottom part of this traveling bridge, given the general designation 303, is immersed in the basin 301 to a water level such that the water covers the pipe 309 and the tube 310, allowing the nozzles 308 to stand above water level. The travelling bridge 303 is suported by a first travelling frame 318 provided with side rollers 319 adapted to run on the bottom of the basin 301 and is suspended on the side walls of this basin by rollers 322 carried by a second frame, indicated generally at 321.

As in the embodiment illustrated in FIGS. 1 and 2, there is provided at the head of the basin 301 (on the left in FIGS. 6 and 7) a siphonic partition 312 bounding an admission compartment 303 and a bottom passage 314. Similarly, residual water is admitted into a pit 329, from which it is taken by a pump 328 to a bent pipe 330 having its mouth above a funnel 331 vertically in line with a deflector 332 above the water level in the compartment 313.

The operation of this installation follows the general principal of treatment already described above.

After any preliminary treatment the residual water is delivered by the pump 328 to the compartment 313 and then passed along the bottom and under the siphonic partition 312. The travelling bridge reciprocates from one end of the basin 301 to the other. The sludge settling on the bottom of the basin 301 is collected by the blades 304 near the end of the suction pipe 307 and pumped into 317, 309, 310 and is then diffused into the air by the nozzles 308 with an angle of inclination such that the trajectory of the particles in the air is most favourable for their oxygenation.

Sludge may be taken at will into the tube 305 for the purpose of discharge through the valve 315 and the flexible pipe 316 to the drying beds.

In this form of construction the downstream portion of the basin 301 serves as decanter, the treated water being collected therein by means which will not be further described.

In comparison with the installation of FIGS. 1 to 5, this last embodiment constitutes a substantial simplification while respecting optimum efficiency of the biochemical process.

The advantage offered by a parallelpipedic shape of the basins consists mainly of the possibility of extending them; a plurality of such basins may easily be juxtaposed in series or in parallel, or else the upstream or downstream partition may be removed and the basin enlarged to the desired length. Nevertheless the circular concentric arrangement is of economic interest. The radial partition may be eliminated, as in the embodiment in FIG. 5, if it is accepted that the affluent can be diluted in the mass without prejudice to its treatment and if it is desired to dispense with the arrangement of the micro-organism and sludge in order according to age, in which case of course the scraper bridge always turns in the same direction.

Whatever the type of installation adopted, this process ensures excellent purification efficiency because it increases the efficiency of the biochemical process through substantial oxidation of the sludge with particularly simple constructional means, the use of which offers very great flexibility of adaptation. The installation is designed and the flow of effluents calculated with due consideration to the relative water treatment time, generally of the order of a few hours, and sludge treatment time of the order of several weeks.

The invention is applicable to the purification of sewage in general before it is discharged into rivers, to the treatment of drinking waters, or to the treatment of water in the chemical industry, for example.

The present invention is naturally not limited to the embodiments described and illustrated, but covers all alternative embodiments.

Instead of being horizontal, the deflectors 10 could be disposed vertically to form between them a series of vertical flow slots; it is also possible to contemplate a more or less oblique arrangement, and so on.

I claim:

1. A sewage treatment plant comprising a basin having an upstream end and a downstream end in which there is a flow of progressively treated sludge toward the downstream end, a sewage intake located at the upstream end, a treated water outlet located at the downstream end, a travelling bridge mounted for reciprocating movement along the basin between the upstream and downstream ends, sludge aerating and recycling means mounted on the travelling bridge forming a sludge circuit including a suction intake located adjacent to the bottom of the basin, suction pump means for drawing said sludge from the bottom of the basin through the suction intake, and nozzle means constructed and arranged for receiving said sludge from said pump means and aerating it by spraying it into the air, the effective direction of the sprayed sludge being toward the upstream end of the basin whereby the sludge is continually recycled in an upstream direction counter to the downstream flow of the progressively treated sewage.

2. A sewage treatment plant according to claim 1, further comprising scraper means mounted on the travelling bridge immediately adjacent to the bottom of the basin for collecting said sludge in the vicinity of the suction intake.

3. A sewage treatment plant according to claim 2, wherein the scraper means comprises a deflector having blades arranged to move the suction towards the sludge intake.

4. A sewage treatment plant according to claim 1, wherein the sludge intake is mounted inside a sludge trap, the sludge trap extending over and around the sludge intake to prevent the sludge from rising in the basin.

5. A sewage treatment plant according to claim 1, wherein the nozzle means comprises a pipe extending along the bridge, a plurality of spray nozzles arranged along the pipe and a series of partitions mounted on the bridge limiting the range of the spray nozzle.

6. A sewage treatment plant according to claim 1, wherein the sludge intake is located downstream of the nozzle means thereby further accentuating the upstream recycling action.

7. A sewage treatment plant according to claim 1, further comprising a flexible sludge discharge pipe, a sludge discharge pump connected to the discharge pipe and a sludge discharge tube having an admission end connected to the discharge pump and a discharge end connected to the discharge pipe.

8. A sewage treatment plant according to claim 1, further comprising a plurality of agitation deflectors arranged above the scraper means.

9. An installation according to Claim 8, wherein said system of agitation deflectors is formed of a series of crossed sections between two pairs of vertical uprights.

10. A sewage treatment plant according to claim 1, wherein the basin is rectangular in shape, and wherein the travelling bridge extends transversely across the shortest dimension of the basin with its path of reciprocating movement in the longitudinal direction.

11. A sewage treatment plant according to claim 1, wherein the basin is of annular shape, and wherein the travelling bridge extends radially thereacross, the path of reciprocating movement of the travelling bridge being partially circular.

12. A sewage treatment plant according to claim 11, further comprising a separate settling tank located alongside the basin, and cascade overflow means for connecting the downstream end of the basin to the upstream end of the settling tank, and wherein the downstream end of the settling tank is in lateral alignment with the sewage intake in the basin.

13. A sewage treatment plant according to claim 12, further comprising a separate settling tank arranged inside the outer annular basin, the downstream end of the basin being connected to the settling tank.

14. An installation according to Claim 1, wherein a dispersal deflector is provided facing said delivery nozzle.

15. An installation according to Claim 1, wherein at the outlet of the oxidation basin a spout is provided for discharging the water to a decanter, said spout being connected to a water intake the depth of which can be adjusted by a telescopic pipe.

16. A sewage treatment plant comprising a single basin for aerating and settling having upstream and downstream ends in which there is a continuous flow of sludge toward the downstream end, a sewage intake located at the upstream end, a treated water outlet located at the downstream end, a travelling bridge mounted for reciprocating movement along the basin between the upstream and downstream ends, means for aerating and recycling the sludge mounted on the travelling bridge comprising a sludge circuit including a suction intake adjacent to the bottom of the basin, suction pump means for drawing sludge through the suction intake from the bottom of the basin and nozzle means constructed and arranged for receiving sludge from the pump means and spraying it into the air, the travelling bridge dividing the basin into an aerating zone located between the travelling bridge and the upstream end of the basin and a settling zone located between the travelling bridge and the downstream end of the basin, the effective direction of the sprayed sludge being toward the upstream end of the aerating zone whereby the sludge is continually recycled from the settling zone to the aerating zone counter to the flow of progressively treated sewage.

17. A sewage treatment plant according to claim 16, wherein the suction intake is arranged downstream of the nozzle means thereby contributing to the upstream recycling action.

18. A method for treating sewage comprising introducing the sewage into a basin through an intake located at the upstream end of the basin and allowing it to flow toward the downstream end of the basin, pumping sludge from the bottom of the basin and spraying it in an upstream direction from a plurality of nozzles located on a bridge above the basin to aerate it whereby the sludge is recycled through the basin, moving the bridge along the basin in a reciprocatory manner as the sludge is sprayed.

19. The sewage treatment method of claim 18 further comprising varying the movement of the bridge between a path that encompasses a major portion of the basin and a path that encompasses a small selected portion of the basin, the cycle time of the reciprocating movement of the basin being in accordance with the length of the path.

References Cited
UNITED STATES PATENTS

| 3,669,271 | 6/1972 | McGivern | 210—527 X |
| 3,333,704 | 8/1967 | McGivern et al. | 210—527 X |
| 3,353,683 | 11/1967 | Geiger | 210—530 X |
| 3,595,783 | 7/1971 | Pflanz et al. | 210—197 X |
| 2,014,431 | 9/1935 | Foster | 210—255 |
| 3,400,822 | 9/1968 | McKeown | 210—197 X |
| 3,353,679 | 11/1967 | Hirsch | 210—528 X |
| 3,494,462 | 2/1970 | Baud | 210—528 X |
| 3,421,626 | 1/1969 | Schramm et al. | 210—195 X |
| 3,330,413 | 7/1967 | Danjes | 210—15 X |
| 3,239,067 | 3/1966 | Hikes et al. | 210—197 X |

FOREIGN PATENTS

| 1,369,047 | 6/1963 | France | 210—197 |
| 1,130,377 | 5/1962 | Germany | 210—197 |

SAMIH N. ZAHARNA, Primary Examiner

R. H. SPITZER, Assistant Examiner

U.S. Cl. X.R.

210—151, 197, 219, 220, 528